US011076333B2

United States Patent
Wang et al.

(10) Patent No.: US 11,076,333 B2
(45) Date of Patent: Jul. 27, 2021

(54) LOCATION MANAGEMENT METHOD AND DEVICE

(71) Applicant: CHINA ACADEMY OF TELECOMMUNICATIONS TECHNOLOGY, Beijing (CN)

(72) Inventors: Ying Wang, Beijing (CN); Li Chen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 85 days.

(21) Appl. No.: 16/475,356

(22) PCT Filed: Feb. 12, 2018

(86) PCT No.: PCT/CN2018/076493
§ 371 (c)(1),
(2) Date: Jul. 1, 2019

(87) PCT Pub. No.: WO2018/127242
PCT Pub. Date: Jul. 12, 2018

(65) Prior Publication Data
US 2020/0404570 A1      Dec. 24, 2020

(30) Foreign Application Priority Data
Jan. 6, 2017   (CN) .......................... 201710010828.9

(51) Int. Cl.
*H04J 3/00* (2006.01)
*H04W 36/32* (2009.01)
(Continued)

(52) U.S. Cl.
CPC ........... *H04W 36/32* (2013.01); *H04W 4/029* (2018.02); *H04W 36/0033* (2013.01); *H04W 36/08* (2013.01); *H04W 64/00* (2013.01)

(58) Field of Classification Search
CPC ..... H04W 76/27; H04W 68/02; H04W 36/08; H04W 60/00; H04W 76/11;
(Continued)

(56) References Cited

U.S. PATENT DOCUMENTS

| 9,357,545 B2 * | 5/2016 | Maeda | H04W 36/0061 |
| 10,778,697 B2 * | 9/2020 | Cho | H04W 12/1006 |

(Continued)

FOREIGN PATENT DOCUMENTS

| CN | 101043704 A | 9/2007 |
| CN | 105025465 A | 11/2015 |
| CN | 108616941 A | 10/2019 |

OTHER PUBLICATIONS

International Search Report for PCT/CN2018/076493 dated Dec. 12, 2018 and its English translation provided by WIPO.
(Continued)

*Primary Examiner* — Joseph Arevalo
(74) *Attorney, Agent, or Firm* — Ladas & Parry, LLP (57) ABSTRACT

A location management method and a location management device are provided by the present disclosure. The location management method includes: storing, by a network side, location information of User Equipment (UE), when the UE transmits uplink data; or updating, by the network side, the location information of the UE, when the UE reselects another cell and issues a cell update report to an accessed base station.

16 Claims, 7 Drawing Sheets

(51) Int. Cl.
*H04W 4/029* (2018.01)
*H04W 36/00* (2009.01)
*H04W 36/08* (2009.01)
*H04W 64/00* (2009.01)

(58) Field of Classification Search
CPC .......... H04W 68/005; H04W 72/0453; H04W 60/04; H04W 48/02; H04W 36/0022
USPC ........ 455/436, 443, 522; 370/331, 352, 254, 370/329, 241, 332, 252, 328, 312, 522
See application file for complete search history.

(56) References Cited

U.S. PATENT DOCUMENTS

| | | | | |
|---|---|---|---|---|
| 2012/0190363 | A1* | 7/2012 | Maeda | H04W 36/0072 455/435.1 |
| 2013/0310038 | A1 | 11/2013 | Wang et al. | |
| 2014/0301371 | A1* | 10/2014 | Maeda | H04W 36/06 370/331 |
| 2015/0358866 | A1* | 12/2015 | Xu | H04W 36/0069 370/331 |
| 2018/0184246 | A1* | 6/2018 | Ryu | H04W 68/06 |
| 2018/0270713 | A1* | 9/2018 | Park | H04W 28/18 |
| 2018/0270791 | A1* | 9/2018 | Park | H04W 8/24 |
| 2018/0270792 | A1* | 9/2018 | Park | H04W 76/28 |
| 2018/0270894 | A1* | 9/2018 | Park | H04W 76/27 |
| 2018/0270895 | A1* | 9/2018 | Park | H04W 76/38 |
| 2019/0166576 | A1* | 5/2019 | Kim | H04W 36/08 |
| 2019/0174571 | A1* | 6/2019 | Deenoo | H04W 76/11 |
| 2019/0215800 | A1* | 7/2019 | Fujishiro | H04W 76/27 |
| 2019/0357065 | A1* | 11/2019 | Oho | H04W 24/08 |
| 2020/0029237 | A1* | 1/2020 | Kim | H04W 24/10 |

OTHER PUBLICATIONS

Written Opinion of the International Search Authority for PCT/CN2018/076493 dated May 3, 2018 and its English translation provided by WIPO.

International Preliminary Report on Patentability of the International Search Authority for PCT/CN2018/076493 dated Jul. 9, 2019 and its English translation provided by WIPO.

First office action and search report for Chinese patent application 201710010828.9 dated Dec. 28, 2019 and its English translation provided by SIPO.

"Consideration on "inactive state" in NR" 3GPP TSG RAN WG3 Meeting #93bis R3-162335 Sophia Antipolis, France, Oct. 10-14, 2016, ZTE.

"Inactive State and RAN based notification area" 3GPP TSG RAN WG3 Meeting #93bis R3-162217 Sophia Antipolis, France, Oct. 10-14, 2016, CATT.

* cited by examiner when a UE transmits uplink data, a network side stores location information of the UE; or when the UE reselects another cell and issues a cell update report to an accessed base station, the network side updates the location information of the UE ⎯ 101

FIG. 1 when the UE transmits uplink data to an anchor base station, the anchor base station stores location information of the UE ⎯ 201 when the UE reselects another cell of the anchor base station and transmits a cell update report message to the anchor base station, the anchor base station updates the location information of the UE based on the cell update report message ⎯ 202 when the UE reselects a cell of a new target base station and issues cell updata report to the new target base station, the anchor base station receives location information of the UE reported by the new target base station through a location report of an Xn interface, and updates the location information of the UE ⎯ 203 after receiving downlink data of the UE transmitted by the core network, the anchor base station forward-transmits the downlink data to the new target base station, so that after receiving the downlink data, the new target base station transmits the downlink data to the UE in a cell where the UE is located ⎯ 204

601 when a UE reselects a cell of a new target base station and issues a cell update report message to the new target base station, the new target base station stores location information of the UE based on the cell update report message 602 the new target base station receives downlink data of the UE forward-transmitted by the anchor base station 603 the new target base station transmits the downlink data to the UE in the cell where the UE is located

```
┌─────────────────────────────────────────────────────────────────┐
│ when a UE reselects a cell of a new target base station and issues cell update │ 901
│ report to the new target base station, a core network receives a path update   │
│ request message transmitted from the new target base station, and changes a NG │
│                        connection of the UE                                    │
└─────────────────────────────────────────────────────────────────┘
                                    │
                                    ▼
┌─────────────────────────────────────────────────────────────────┐
│    the core network transmits downlink data of the UE to the new target base   │ 902
│ station, to enable the new target base station to transmit the downlink data to the │
│  UE in a cell where the UE is located, after the new target base station receives │
│                           the downlink data                                    │
└─────────────────────────────────────────────────────────────────┘
```

LOCATION MANAGEMENT METHOD AND DEVICE

CROSS-REFERENCE TO RELATED APPLICATIONS

The present application is the U.S. national phase application of PCT Application No. PCT/CN2018/076493 filed on Feb. 12, 2018, which claims priority from Chinese patent application No. 201710010828.9 filed in China on Jan. 6, 2017, the entire contents of which are incorporated herein by reference in their entireties.

TECHNICAL FIELD

The present disclosure relates to the technical field of communications, and in particular to a location management method and device.

BACKGROUND

In a new generation of wireless communication system (referred to as an NR system or a 5G system), states of radio resource control (RRC) supported by a user equipment (UE) includes: RRC_IDLE, RRC_INACTIVE and RRC_CONNECTED (referred as an idle state, an inactive state and a connected state).

Functions supported by various RRC states are introduced as follows: (1) functions supported by RRC-IDLE: cell reselection; paging issued by a core network; and paging area management performed by the core network; (2) functions supported by RRC_INACTIVE: cell reselection; maintaining a connection between the core network and a NR access network (NR RAN), in this case, the base station being an anchor base station; UE AS context being stored in a gNB (a 5G base station) and the UE; a notification mechanism issued by the NR RAN in a RNA-based notification area (RNA); the NR RAN managing the RAN-based notification area, that is, RNA management; and the NA RAN determining a notification area at an access network side to which the UE belongs; and (3) functions supported by RRC_CONNECTED state: the UE maintaining RRC connection: the UE having an AS context of the NR: the NR RAN determining the cell to which the UE belongs: the UE being able to perform unicast transmission: and mobility of control at the network side, that is, handover.

Before the inactive state is introduced, the UE has only the idle state and the connected state. A location area where the UE is in the idle state is a tracking area, and a location area where the UE is in the connected state is a cell. After the inactive state is introduced, a RNA level location area RNA, i.e., a RNA notification area, is introduced for the UE, and the RNA may include multiple cells. A RNA network side node may issue a notification message in multiple cells in the RNA area to search for the UE. When the UE moves out of one RNA, the RNA is required to be updated to enable the RNA network side node to find the UE.

In the inactive state, the mobility of the UE is realized by a cell reselection mechanism. A cell reselection process is triggered by the UE itself, and it is unnecessary and impossible to notify the network side. The network side manages the location of the UE only in the RNA, that is, the network side only knows a RAN notification area where the UE is located, and does not know which cell in the RNA area the UE is located in. As such, when the network side has downlink data to transmit, the network side is required to transmit a notification message to the UE in all cells of the entire RNA, and even the network side is required to transmit data in all cells, resulting in high signaling and data overhead, particularly for a situation in which the network side often transmits downlink data to the UE in the inactive state.

SUMMARY

An object of the present disclosure is to provide a location management method and a location management device, to solve the problem in the conventional art that signaling and data overhead is high when a network side transmits downlink data to a user equipment (UE) in an inactive state, In order to achieve the above object, in a first aspect, the present disclosure provides a location management method, including: storing, by a network side, location information of a User Equipment (UE), when the UE transmits uplink data or updating, by the network side, the location information of the UE, when the UE reselects another cell and issues a cell update report to an accessed base station, wherein the UE is of a specific type or has a specific service, and the UE is tracked by the network side.

Optionally, the step of storing by the network side the location information of the UE when the UE transmits the uplink data includes: storing, by an anchor base station, the location information of the UE, when the UE transmits the uplink data to the anchor base station.

Optionally, the step of updating by the network side the location information of the UE when the UE reselects the another cell and issues the cell update report to the accessed base station includes: updating, by the anchor base station, the location information of the UE based on a cell update report message, when the UE reselects the another cell of the anchor base station and transmits the cell update report message to the anchor base station.

Optionally, the step of updating by the network side the location information of the UE when the UE reselects the another cell and issues the cell update report to the accessed base station includes: receiving, by the anchor base station, the location information of the UE reported by a new target base station through a location report of an Xn interface, and updating, by the anchor base station, the location information of the UE, when the UE reselects a cell of the new target base station and issues the cell update report to the new target base station, wherein the new target base station does not notify the anchor base station of a movement of the UE when the UE moves between cells in the new target base station.

Optionally, the location management method further includes: forward-transmitting, by the anchor base station, downlink data of the UE transmitted by a core network to the new target base station after the anchor base station receives the downlink data, to enable the new target base station to transmit the downlink data to the UE in a cell where the UE is located after the new target base station receives the downlink data.

Optionally, the step of storing by the network side the location information of the UE when the UE transmits the uplink data further includes: receiving, by the anchor base station, the location information of the UE reported by the new target base station through a location report or UE context retrieval of an Xn interface, and updating, by the anchor base station, the location information of the UE, when the UE transmits the uplink data to the new target base station.

Optionally, the location management method further includes: receiving, by the anchor base station, the uplink data forward-transmitted by the new target base station; transmitting, by the anchor base station, the uplink data to a core network; and forward-transmitting, by the anchor base station, the downlink data of the UE transmitted by the core network to the new target base station, after the anchor base station receives the downlink data, to enable the new target base station to transmit the downlink data to the UE in a cell where the UE is located, after the new target base station receives the downlink data.

Optionally, the location report process or the UE context retrieval carries at least one type of the following information: an inactive state identifier of the UE, downlink data forward transmission tunnel information, and the location information of the UE.

Optionally, the location information of the UE includes at least one type of the following information: a cell identifier, transmission reference point information, and a base station identifier.

Optionally, the step of updating by the network side the location information of the UE when the UE reselects the another cell and issues the cell update report to the accessed base station includes: storing, by the new target base station, the location information of the UE based on a cell update report message, when the UE reselects a cell of the new target base station and transmits the cell update report message to the new target base station, wherein the cell update report message carries an inactive state identifier of the UE.

Optionally, in the case that a base station which the UE accesses last time is not an anchor base station, and the cell update report message further carries information of an original target base station which the UE accesses last time, the location management method further includes: issuing, by the new target base station, UE context release to the original target base station based on the information of the original target base station, to enable the original target base station to release a context of the UE.

Optionally, the location management method further includes: receiving, by the new target base station, downlink data of the UE forward-transmitted by the anchor base station, wherein the anchor base station receives the downlink data from the core network, and issues UE context retrieval or a new Xn process to another base station in an access network notification area after the anchor base station receives the downlink data, and the anchor base station receives downlink data forward transmission tunnel information and indication information including a context of the UE returned by the new target base station, and receives indication information including no context of the UE returned by a base station including no context of the UE in the access network notification area, wherein the UE context retrieval or the new Xn process carries an inactive state identifier of the UE, and the base station including no context of the UE does not return the downlink data forward transmission tunnel information; and transmitting, by the new target base station, the downlink data to the UE in a cell where the UE is located.

Optionally, the step of updating by the network side the location information of the UE when the UE reselects the another cell and issues the cell update report to the accessed base station includes: receiving, by a core network, a path update request message transmitted by the new target base station to change a NG connection of the UE, when the UE reselects a cell of the new target base station and issues the cell update report to the new target base station, wherein the new target base station does not notify the core network of a movement of the UE when the UE moves between cells in the new target base station.

Optionally, the location management method further includes: transmitting, by the core network, downlink data of the UE to the new target base station, to enable the new target base station to transmit the downlink data to the UE in a cell where the UE is located, after the new target base station receives the downlink data.

In a second aspect, the present disclosure further provides a location management device, including: a storage module configured to store location information of a UE when the UE transmits uplink data: and an updating module configured to update the location information of the UE when the UE reselects another cell and issues a cell update report to an accessed base station, wherein the UE is of a specific type or has a specific service, and the UE is tracked by the network side.

Optionally, the location management device is applied to an anchor base station, and the storage module is configured to: store location information of the UE when the UE transmits the uplink data to the anchor base station.

Optionally, the updating module is configured to: update the location information of the UE based on a cell update report message, when the UE reselects the another cell of the anchor base station and transmits the cell update report message to the anchor base station.

Optionally, the updating module is configured to: receive the location information of the UE reported by a new target base station through a location report of an Xn interface, and update the location information of the UE, when the UE reselects a cell of the new target base station and issues the cell update report to the new target base station, wherein the new target base station does not notify the anchor base station of a movement of the UE when the UE moves between cells in the new target base station.

Optionally, the location management device further includes a first forward transmission module configured to: forward-transmit downlink data of the UE transmitted by a core network to the new target base station after receiving the downlink data, to enable the new target base station to transmit the downlink data to the UE in a cell where the UE is located after the new target base station receives the downlink data.

Optionally, the storage module is further configured to: receive the location information of the UE reported by the new target base station through a location report or UE context retrieval of an Xn interface, and update the location information of the UE, when the UE transmits the uplink data to the new target base station.

Optionally, the location management module further includes: a first receiving module configured to receive the uplink data forward-transmitted by the new target base station; a first transmission module configured to transmit the uplink data to a core network; and a second forward transmission module configured to forward-transmit the downlink data of the UE transmitted by the core network to the new target base station, after receiving the downlink data, to enable the new target base station to transmit the downlink data to the UE in a cell where the UE is located, after the new target base station receives the downlink data.

Optionally, the location report or the UE context retrieval carries at least one type of the following information: an inactive state identifier of the UE, downlink data forward transmission tunnel information, and the location information of the UE.

Optionally, the location information of the UE includes at least one type of the following information: a cell identifier, transmission reference point information, and a base station identifier.

Optionally, the location management device is applied to a new target base station, and the updating module is configured to: store the location information of the UE based on a cell update report message, when the UE reselects a cell of the new target base station and transmits the cell update report message to the new target base station, wherein the cell update report message carries an inactive state identifier of the UE.

Optionally, in the case that a base station which the UE accesses last time is not an anchor base station, and the cell update report message further carries information of an original target base station which the UE accesses last time, the location management device further includes:

an issuing module configured to issue UE context release to the original target base station based on the information of the original target base station, to enable the original target base station to release a context of the UE.

Optionally, the location management device further includes: a second receiving module configured to receive downlink data of the UE forward-transmitted by the anchor base station, wherein the anchor base station receives the downlink data from the core network, and issues UE context retrieval or a new Xn process to another base station in an access network notification area after the anchor base station receives the downlink data, and the anchor base station receives downlink data forward transmission tunnel information and indication information including a context of the UE returned by the new target base station, and receives indication information including no context of the UE returned by a base station including no context of the UE in the access network notification area, wherein the UE context retrieval or the new Xn process carries an inactive state identifier of the UE, and the base station including no context of the UE does not return the downlink data forward transmission tunnel information; and a second transmission module configured to transmit the downlink data to the UE in a cell where the UE is located.

Optionally, the location management device is applied to a core network, and the updating module is configured to: receive a path update request message transmitted by the new target base station to change a NG connection of the UE, when the UE reselects a cell of the new target base station and issues the cell update report to the new target base station, wherein the new target base station does not notify the core network of a movement of the UE when the UE moves between cells in the new target base station.

Optionally, the location management device further includes a third transmission module configured to: transmit downlink data of the UE to the new target base station, to enable the new target base station to transmit the downlink data to the UE in a cell where the UE is located, after the new target base station receives the downlink data.

In a third aspect, the present disclosure further provides a location management device. The location management device includes: a processor; and a memory connected to the processor via a bus interface and configured to store computer instructions and data used by the processor when performing operations, wherein the processor is configured to call and execute the computer instructions, to implement the method according to the first aspect.

In a fourth aspect, the present disclosure further provides a non-volatile storage medium storing therein computer instructions and data, wherein the computer instructions are configured to be called and executed by a processor, to implement the method according to the first aspect.

With the location management method according to the present disclosure, the location information of the UE is stored or updated in real time by the network side, and the location of the UE is effectively managed, so that the base station accessed by the UE transmits downlink data of the UE to the UE directly from the cell where the UE is located, after the base station receives the downlink data, with no need to transmit a notification message and data to the UE from all cells of an entire RNA, thereby saving signaling overhead of both the network side and the UE side, reducing power consumption of the UE, and achieving effective transmission of data (if any) of the UE.

BRIEF DESCRIPTION OF THE DRAWINGS

In order to illustrate technical solutions in embodiments of the present disclosure clearer, drawings to be used in the description of the embodiments of the present disclosure are introduced briefly hereinafter. Apparently, the drawings described below show only some embodiments of the present disclosure, and those skilled in the art may obtain other drawings according to these drawings without creative effort.

DETAILED DESCRIPTION

Technical solutions in the embodiments of the present disclosure are described below clearly and completely in conjunction with accompanying drawings in the embodiments of the present disclosure. Apparently, the embodiments described herein are only some embodiments of the present disclosure, rather than all the embodiments. All other embodiments obtained by those skilled in the art based on the embodiments of the present disclosure without creative effort will fall within the scope of protection of the present disclosure.

Figure 1:
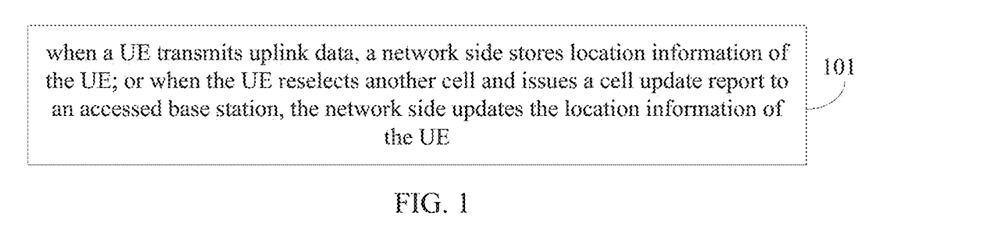
FIG. 1 is a flowchart of a location management method according to the present disclosure.

Reference is made to FIG. 1, which shows a location management method according to an embodiment of the present disclosure. The location management method includes step 101.

In step 101, when a user equipment (UE) transmits uplink data, a network side stores location information of the UE; or when the UE reselects another cell and issues a cell update report to an accessed base station, the network side updates the location information of the UE.

In this way, the location information of the UE is stored or updated in real time by the network side, so that the base station accessed by the UE transmits downlink data of the UE to the UE directly from a cell where the UE is located, when the base station receives the downlink data, with no need to transmit a notification message and data to the UE from all cells of an entire RNA-based notification area (RNA), thereby saving signaling overhead of both the network side and the UE side, reducing power consumption of the UE, and achieving effective transmission of data (if any) of the UE.

In the embodiment of the present disclosure, the UE is a UE in an inactive state, and is a UE of a specific type or a UE having a specific service, which is tracked by the network side. The UE of a specific type or the UE having a specific service is determined by configurations of the network side or by the UE itself.

Specifically, the network side determines the UE of a specific type or having a specific service by configuring, for example, a UE type identifier (such as eMTC UE, or URLLC UE, or UE capability level), an application layer identifier (AP ID) of a specific service, a bearer identifier (RB ID) of a specific service, a logical channel identifier (LCID) of a specific service, or a flow identifier (flow ID) of a specific service. The UE itself determines the UE of a specific type or having a specific service in the following way. The UE starts a cell update report mechanism after transmitting uplink data, or the UE starts a cell update report mechanism after transmitting uplink data of a specific service. The UE itself may stop the cell update report mechanism after transmitting uplink data in a cache and receiving corresponding downlink data. The cell update report mechanism indicates the following process: in a case of satisfying the principle of determining by the configuration of the network side or by the UE itself, the UE in the inactive state reselects another cell by a cell, issues uplink transmission to a gNB, and informs the gNB of a cell where the UE is currently located.

In the embodiment of the present disclosure, the network side may be an anchor base station, a new target base station (that is, a base station which the UE reselects to access), or a core network.

The location information of the UE is, for example, a cell identifier (cell ID), transmission reference point information (TPR information), and/or a base station identifier (eNB ID).

With the location management method according to the embodiment of the present disclosure, the location information of the UE is stored or updated in real time by the network side, and the location of the UE is effectively managed, so that the base station accessed by the UE transmits downlink data of the UE to the UE directly from the cell where the UE is located, after the base station receives the downlink data, with no need to transmit a notification message and data to the UE from all cells of an entire RNA, thereby saving signaling overhead of both the network side and the UE side, reducing power consumption of the UE, and achieving effective transmission of data (if any) of the UE.

Figure 2:
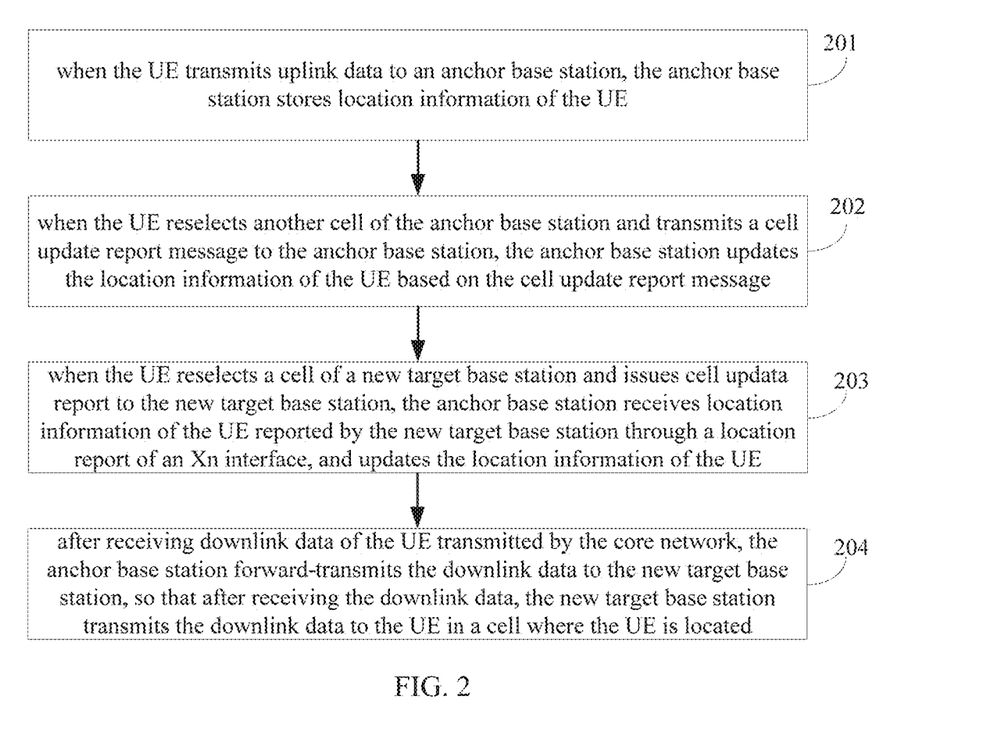
FIG. 2 is a flowchart of a location management method applied to an anchor base station according to the present disclosure.

Reference is made to FIG. 2, which shows a location management method applied to an anchor base station according to an embodiment of the present disclosure. The method includes the following steps 201 to 204.

In step 201, when a User Equipment (UE) transmits uplink data to an anchor base station, the anchor base station stores location information of the UE.

In the embodiment of the present disclosure, the UE is a UE in an inactive state, and is a UE of a specific type or a UE having a specific service, which is tracked by a network side. The location information of the UE is, for example, a cell ID or TRP information. As such, after receiving downlink data of the UE transmitted from a core network, the anchor base station may transmit the downlink data to the UE, in a cell where the UE is currently located.

In step 202, when the UE reselects another cell of the anchor base station and transmits a cell update report message to the anchor base station, the anchor base station updates the location information of the UE based on the cell update report message.

In the embodiment of the present disclosure, the UE transmitting the cell update report message to the anchor base station refers to issuing a cell update report to the anchor base station. As such, after receiving downlink data of the UE transmitted from a core network, the anchor base station may transmit the downlink data to the UE, in a cell where the UE is currently located, i.e., the reselected cell.

In step 203, when the UE reselects a cell of the new target base station and issues a cell update report to the new target base station, the anchor base station receives location information of the UE reported by the new target base station through a location report of an Xn interface, and updates the location information of the UE.

In the embodiment of the present disclosure, when the UE moves between cells in the new target base station, the new target base station updates the location information of the UE and does not notify the anchor base station of a movement of the UE. The location report may carry at least one type of the following information: an inactive identifier of the UE, downlink data forward transmission tunnel information, and the location information of the UE. The location information of the UE may include at least one type of the following information: a cell identifier, transmission reference point information, and a base station identifier.

In step 204, after receiving the downlink data of the UE transmitted by the core network, the anchor base station forward-transmits the downlink data to the new target base station, so that after receiving the downlink data, the new target base station transmits the downlink data to the UE, in a cell where the UE is located.

In this way, a case that the new target base station transmits a notification message and data to the UE in all cells of the entire RNA can be avoided, thereby achieving effective and timely transmission of the data (if any) of the UE.

A first example of the location management method according to the embodiment of the present disclosure shown in FIG. 2 is further described in connection with FIG. 3 hereinafter.

Figure 3:
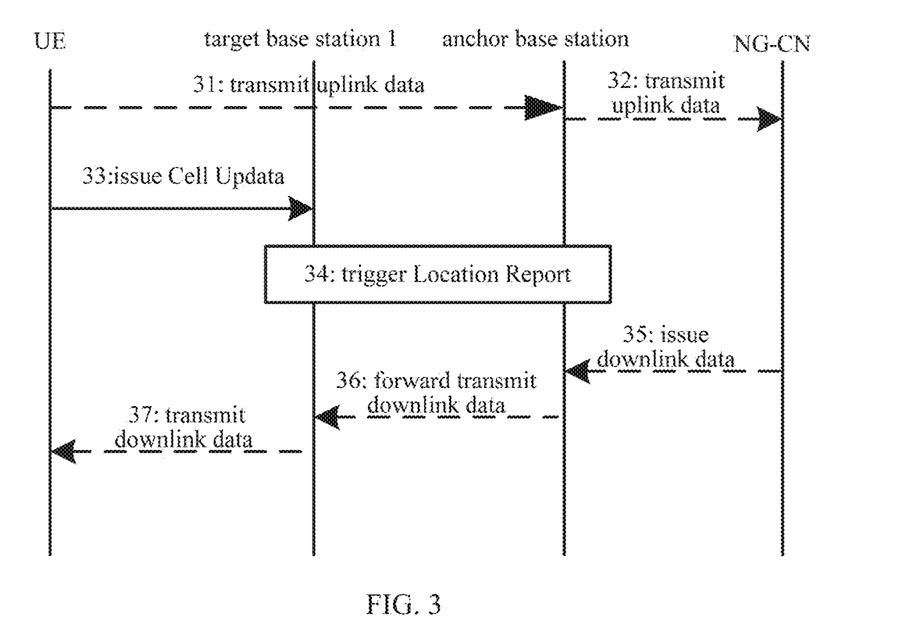
FIG. 3 is a flowchart of a first example of a location management method according to the present disclosure.

As shown in FIG. 3, the example of the location management method includes steps 31 to 37.

In step 31, a UE transmits uplink data (UL data) to an anchor base station, and the anchor base station stores location information of the UE.

In step 32, the anchor base station transmits the UL data to a NG-CN (that is, a core network).

In step 33, the UE reselects a cell of a target base station 1 (that is, a new target base station), and issues cell update (that is, a cell update report process) to the target base station 1. The cell update at least carries UE inactive ID.

In step 34, the target base station 1 triggers location report of an Xn interface according to the UE inactive ID, and reports the location information of the UE to the anchor base station. The anchor base station updates the location information of the UE.

In step 35, the NG-CN issues downlink data (DL data) of the UE to the anchor base station.

In step 36, the anchor base station forward-transmits the DL data to the target base station 1.

In step 37, the target base station 1 transmits the DL data to the UE in a current cell of the UE.

Figure 4:
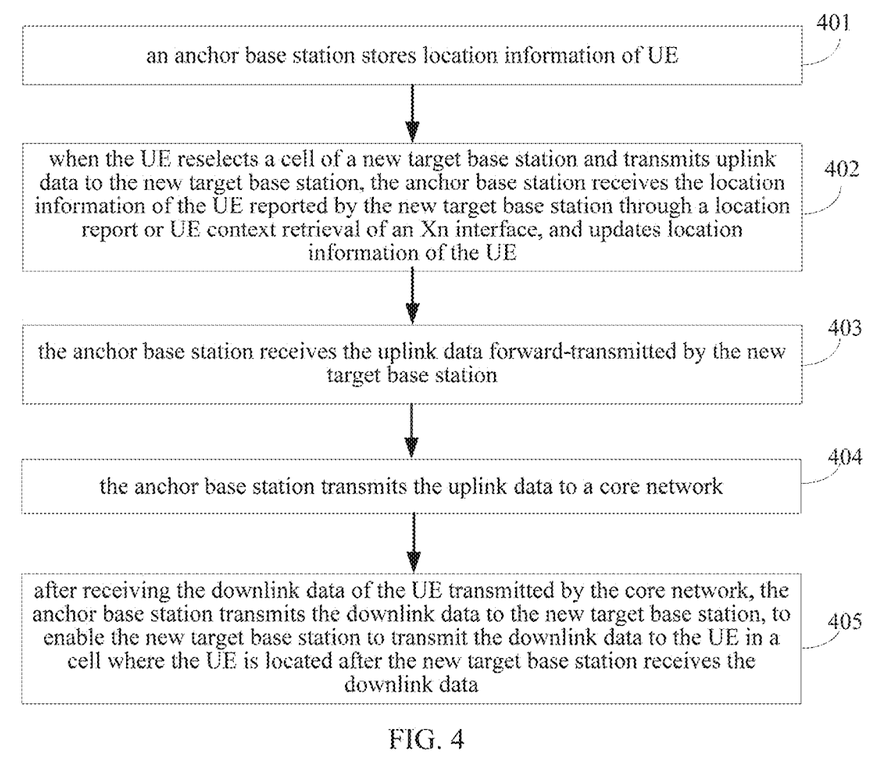
FIG. 4 is a flowchart of another location management method applied to an anchor base station according to the present disclosure.

Reference is made to FIG. 4, which shows another location management method according to an embodiment of the present disclosure. The location management method is applied to an anchor base station, and includes the following steps 401 to 405.

In step 401, the anchor base station stores location information of the UE.

In the embodiment of the present disclosure, the UE is a UE in an inactive state, and is a UE of a specific type or a UE having a specific service, which is tracked by a network side. The location information of the UE is, for example, a cell ID or TPR information. If the UE transmits uplink data to the anchor base station, the anchor base station may store location information of the UE. If the UE reselects another cell of the anchor base station and issues a cell update report to the anchor base station, the anchor base station may update the location information of the UE.

In step 402, when the UE reselects a cell of a new target base station and transmits uplink data to the new target base station, the anchor base station receives the location information of the UE reported by the new target base station through a location report or UE context retrieval of an Xn interface, and updates the location information of the UE.

In the embodiment of the present disclosure, when the UE moves between cells in the new target base station, the new target base station updates the location information of the UE and does not notify the anchor base station of a movement of the UE. The location report process or the UE context retrieval may carry at least one type of the following information: an inactive state identifier of the UE, uplink and downlink data forward transmission tunnel information, and the location information of the UE. The location information of the UE may include at least one type of the following information: a cell identifier, transmission reference point information, and a base station identifier.

In step 403, the anchor base station receives the uplink data forward-transmitted by the new target base station.

In the embodiment of the present disclosure, the new target base station forward-transmits the uplink data to the anchor base station based on the uplink data forward transmission tunnel information.

In step 404, the anchor base station transmits the uplink data to a core network.

In the embodiment of the present disclosure, the uplink data is forward-transmitted to the anchor base station by the new target base station.

In step 405, after receiving the downlink data of the UE transmitted by the core network, the anchor base station transmits the downlink data to the new target base station, to enable the new target base station to transmit the downlink data to the UE in a cell where the UE is located after the new target base station receives the downlink data.

It should be noted that, based on the present embodiment, if the UE reselects a cell of another target base station, that is, reselects a new target base station from an original target base station, then the new target base station triggers location report of an Xn interface, to enable the anchor base station to update location information of the UE, and meanwhile the anchor base station also notifies the original target base station to release a UE context in the original target base station.

A second example of the location management method according to the present disclosure is described hereinafter in connection with FIG. 5.

Figure 5:
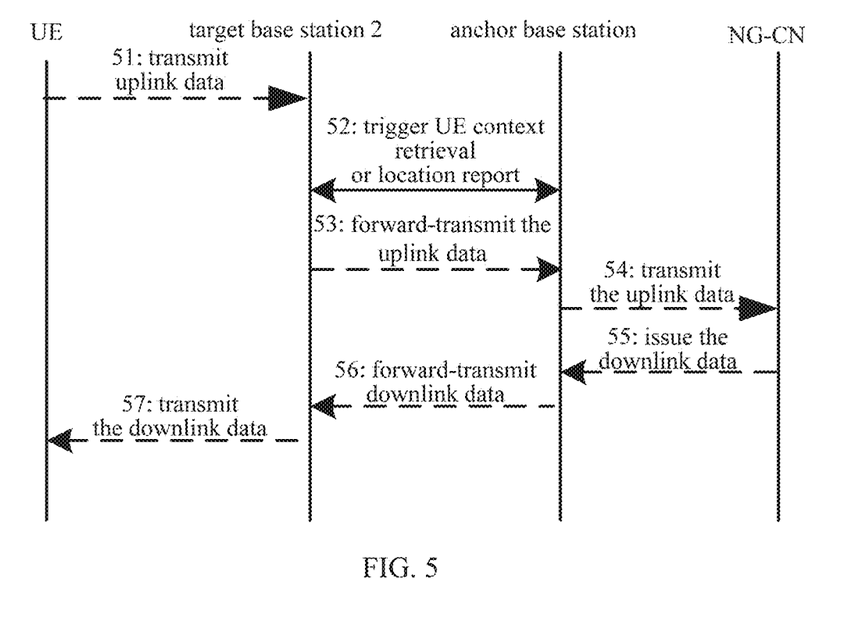
FIG. 5 is a flowchart of a second example of a location management method according to the present disclosure.

As shown in FIG. 5, the location management method includes steps 51 to 57.

In step 51, a UE transmits UL data to a target base station 2 (that is, a new target base station).

In step 52, the target base station 2 triggers UE context retrieval or location report of an Xn interface based on UE inactive ID, to report the location information of the UE to an anchor base station, and the anchor base station updates the location information of the UE.

In step 53, the target base station 2 forward-transmits the UL data to the anchor base station.

In step 54, the anchor base station transmits the UL data to a NG-CN.

In step 55, the NG-CN issues the DL data of the UE to the anchor base station.

In step 56, the anchor base station forward-transmits the UL data to the target base station 2.

In step 57, the target base station 2 transmits the DL data to the UE in a current cell of the UE.

Compared with the previous embodiment, with the location management method according to the present embodiment of the present disclosure, the anchor base station effectively manages the location of the UE, so that the base station accessed by the UE transmits downlink data of the UE to the UE directly from the cell where the UE is located, after the base station receives the downlink data, thereby saving signaling overhead of both the network side and the UE side, reducing power consumption of the UE, and achieving effective transmission of data (if any) of the UE.

Figure 6:
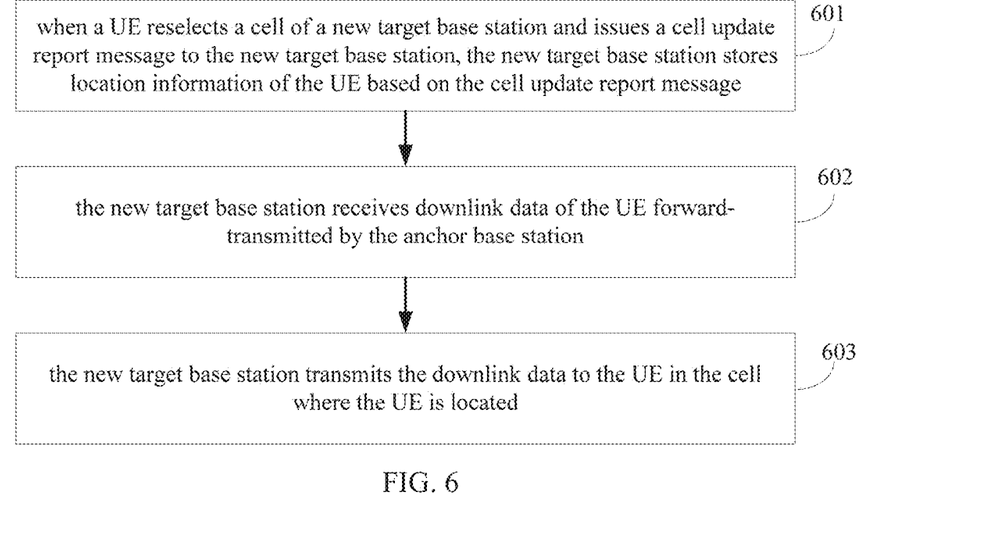
FIG. 6 is a flowchart of a location management method applied to a new target base station according to the present disclosure.

Reference is made to FIG. 6, which shows a location management method according to an embodiment of the present disclosure. The location management method is applied to a new target base station and includes the following steps 601 to 603.

In step 601, when a UE reselects a cell of a new target base station and issues a cell update report message to the new target base station, the new target base station stores location information of the UE based on the cell update report message.

In the embodiment of the present disclosure, the new target base station is a target base station which the UE currently accesses. The cell update report message may carry an inactive state identifier of the UE.

The UE is a UE in an inactive state, and is a UE of a specific type or a UE having a specific service, which is tracked by the network side.

When the UE reselects a cell of the new target base station and before the UE transmits the cell update report message to the new target base station, the base station which the UE accesses last time may be an anchor base station or an original target base station. If the UE transmits uplink data to the anchor base station, the anchor base station may store the location information of the UE. If the UE reselects another cell of the anchor base station and issues a cell update report to the anchor base station, the anchor base station may update the location information of the UE. After receiving downlink data issued by a core network, the anchor base station may transmit the downlink data to the UE in a current cell of the UE.

If the base station which the UE accesses last time is an original target base station instead of an anchor base station, the cell update report message may further carry information of the original target base station. In this case, the location management method further includes: issuing, by the new target base station, UE context release to the original target base station based on the information of the original target base station, to enable the original target base station to release a context of the UE.

The anchor base station needs to forward-transmit the downlink data of the UE to a new target base station including the context of the UE, and avoid forward-transmitting the downlink data to the original target base station. Therefore, in order to improve accuracy of data forward transmission and preventing forward-transmitting the data to the original target base station, the new target base station may issue a UE context release process to the original target base station, to release the corresponding UE context in the original target base station. In this way, a data space in the original target base station can be released.

In step 602, the new target base station receives downlink data of the UE forward-transmitted by the anchor base station.

In the embodiment of the present disclosure, the anchor base station may receive the downlink data from the core network, issue the UE context retrieval or a new Xn process to another base station in an access network notification area after the anchor base station receives the downlink data, receive downlink data forward transmission tunnel information and indication information including a context of the UE returned by the new target base station, and receive indication information including no context of the UE returned by a base station including no context of the UE in the access network notification area. The base station including no context of the UE does not return the downlink data forward transmission tunnel information. The UE context retrieval or the new Xn process may carry an inactive state identifier of the UE, and is used for another base station in the access network notification area to inform the anchor base station whether there is a corresponding UE context. In a case that there is a corresponding UE context, the another base station returns corresponding downlink data forward transmission tunnel information to the anchor base station.

In step 603, the new target base station transmits the downlink data to the UE in a cell where the UE is located.

In the embodiment of the present disclosure, since the new target base station stores the location information of the UE, the new target base station may transmit the downlink data to the UE in the cell where the UE is located.

Location management methods in a first example (corresponding to a case that a base station which the UE accesses last time is an anchor base station) and a second example (corresponding to a case that a base station which the UE accesses last time is an original target base station) of the present disclosure are described hereinafter in connection with FIG. 7 and FIG. 8.

Figure 7:
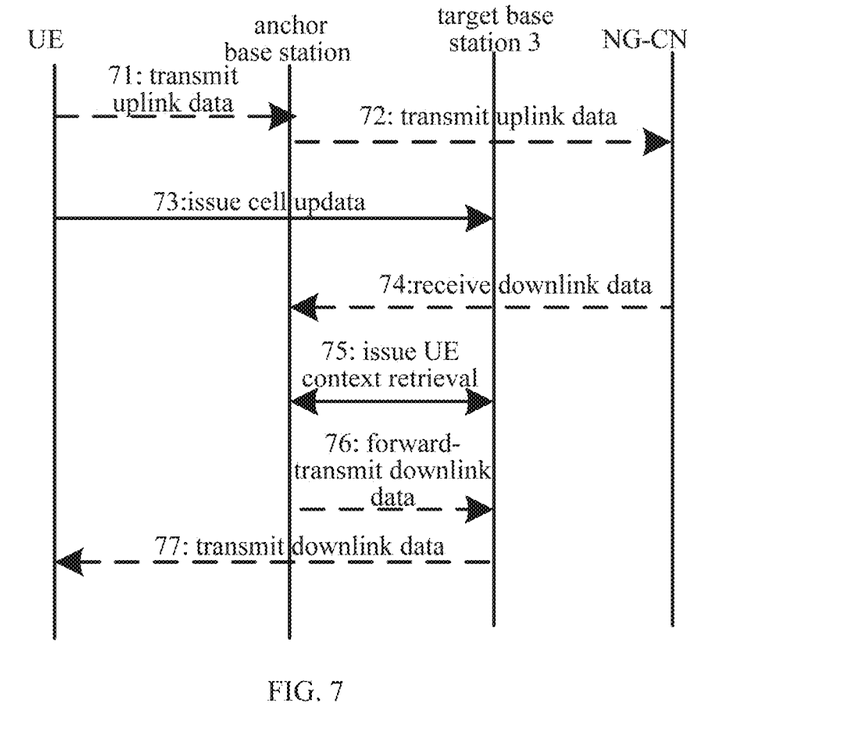
FIG. 7 is a flowchart of a first example of the location management method shown in FIG. 6 according to the present disclosure.

As shown in FIG. 7, the first example of the location management method shown in FIG. 7 includes the following steps 71 to 77.

In step 71, a UE transmits UL data to an anchor base station, and the anchor base station stores location information of the UE.

In step 72, the anchor base station transmits the UL data to a NG-CN.

In step 73, the UE reselects a cell of a target base station 3 (that is, a new target base station), and issues cell update to the target base station 3. The target base station 3 stores the location information of the UE.

In step 74, the anchor base station receives DL data from the NG-CN.

In step 75, the anchor base station issues UE context retrieval to another base station in a RNA area (that is, an access network notification area), to receive downlink data forward transmission tunnel information and indication information including a context of the UE returned by the target base station 3. A base station including no context of the UE in the access network notification area may return indication information including no context of the UE, and does not return downlink data forward transmission tunnel information.

In step 76, the anchor base station forward-transmits the DL data to the target base station 3.

In step 77, the target base station 3 transmits the DL data to the UE in a current cell of the UE.

Figure 8:
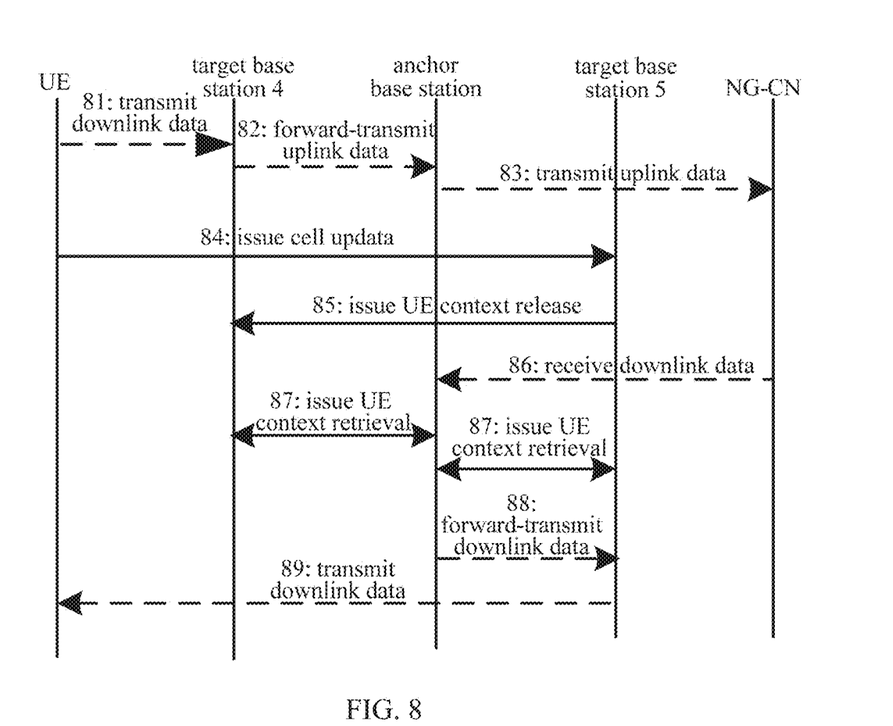
FIG. 8 is a flowchart of a second example of the location management method shown in FIG. 6 according to the present disclosure.

Reference is made to FIG. 8, which shows a location management method. The method includes the following steps 81 to 89.

In step 81, a UE transmits UL data to a target base station 4 (that is, the original target base station), and the target base station 4 stores location information of the UE.

In step 82, the target base station 4 forward-transmits the UL data to an anchor base station.

In step 83, the anchor base station transmits the UL data to a NG-CN.

In step 84, the UE reselects a cell of a target base station 5 (that is, the new target base station) and issues cell update to the target base station 5, and the target base station 5 stores location information of the UE. The cell update carries information of the target base station 4.

In step 85, the target base station 5 issues UE context release to the target base station 4, and the target base station 4 releases the corresponding UE context.

In step 86, the anchor base station receives DL data from the NG-CN.

In step 87, the anchor base station issues UE context retrieval to another base station in a RNA area, for example issuing UE context retrieval to the target base station 4 and the target base station 5, to receive downlink data forward transmission tunnel information and indication information including a context of the UE returned by the target base station 5, and receive indication information including no context of the UE returned by the target base station 4. The target base station 4 does not return downlink data forward transmission tunnel information.

In step 88, the anchor base station forward-transmits the DL data to the target base station 5, and does not forward-transmit the DL data to the target base station 4.

In step 89, the target base station 5 transmits the DL data to the UE in a current cell of the UE.

Compared with the embodiment shown in FIG. 1, with the location management method according to the present embodiment of the present disclosure, the new target base station effectively manages the location of the UE, so that the new target base station transmits downlink data of the UE to the UE directly from the cell where the UE is located, after the new target base station receives the downlink data, thereby saving signaling overhead of both the network side and the UE side, reducing power consumption of the UE, and achieving effective transmission of data (if any) of the UE.

Figure 9:
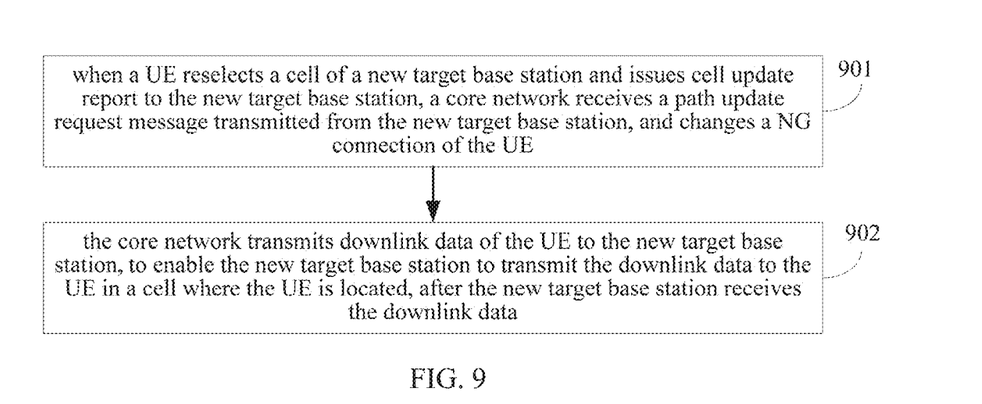
FIG. 9 is a flowchart of a location management method applied to a core network according to the present disclosure.

Reference is made to FIG. 9, which shows a location management method according to an embodiment of the present disclosure. The location management method is applied to a core network and includes the following steps 901 to 902.

In step 901, when a UE reselects a cell of a new target base station and issues cell update report to the new target base station, a core network receives a path update request message transmitted from the new target base station, and changes a NG connection of the UE.

In the embodiment of the present disclosure, when the UE moves between cells in the new target base station, the new target base station does not notify the core network of a movement of the UE.

The UE is a UE in an inactive state, and is a UE of a specific type or a UE having a specific service, which is tracked by the network side. The new target base station is a target base station which the UE currently accesses. The NG connection is specifically a connection between a core network and the accessed base station, that is, the changed NG connection is specifically a connection between the core network and the new target base station.

When the UE reselects a cell of the new target base station and issues a cell update report to the new target base station, the new target base station may store the location information of the UE, and triggers a path update process of the core network, to enable the core network to change the NG connection of the UE.

In step 902, the core network transmits downlink data of the UE to the new target base station, to enable the new target base station to transmit the downlink data to the UE in a cell where the UE is located, after the new target base station receives the downlink data.

In the embodiment of the present disclosure, since the core network changes the NG connection of the UE to a connection between the core network and the new target base station, the core network may transmit the downlink data of the UE to the new target base station.

A specific example of the location management method according to the embodiment shown in FIG. 9 is described hereinafter in connection with FIG. 10.

Figure 10:
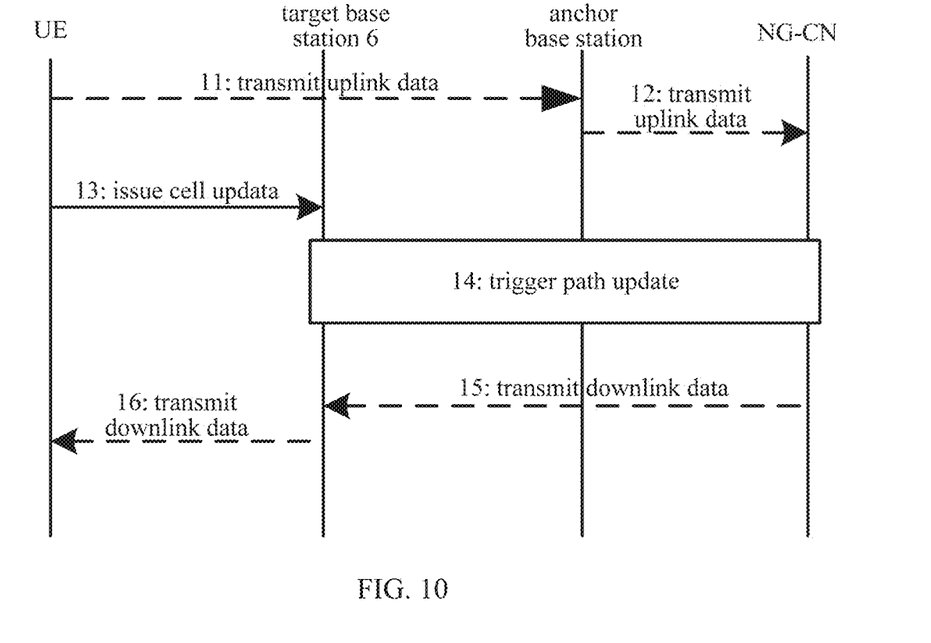
FIG. 10 is a flowchart of a specific example of the location management method shown in FIG. 9 according to the present disclosure.

As shown in FIG. 10, the location management method includes the following steps 11 to 15.

In step 11, a UE transmits UL data to an anchor base station, and the anchor base station stores location information of the UE.

In step 12, the anchor base station transmits the UL data to a NG-CN.

In step 13, the UE reselects a cell of a target base station 6, and issues cell update to the target base station 6, wherein the target base station 6 stores location information of the UE.

In step 14, the target base station 6 triggers path update of the NG-CN, and the NG-CN changes a NG connection of the UE.

In step 15, the NG-CN transmits DL data of the UE to the target base station 6 after the NG connection is changed.

In step 16, the target base station 6 transmits the DL data to the UE in a current cell of the UE.

Compared with the embodiment shown in FIG. 1, with the location management method according to the embodiment of the present disclosure shown in FIG. 9, the core network effectively manages the location of the UE, so that the base station accessed by the UE transmits downlink data of the UE to the UE directly from the cell where the UE is located after the base station receives the downlink data, thereby saving signaling overhead of both the network side and the UE side, reducing power consumption of the UE, and achieving effective transmission of data (if any) of the UE.

Figure 11:
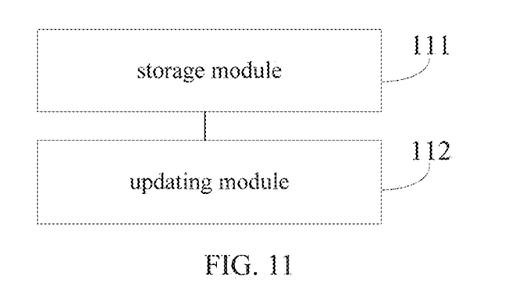
FIG. 11 is a schematic structural diagram of a location management device according to the present disclosure.

Reference is made to FIG. 11, which shows a location management device according to an embodiment of the present disclosure. The location management device includes a storage module 111 and an updating module 112. The storage module 111 is configured to store location information of a UE when the UE transmits uplink data. The updating module 112 is configured to update the location information of the UE when the UE reselects another cell and issues a cell update report to an accessed base station, wherein the UE is of a specific type or has a specific service, and the UE is tracked by the network side.

In the embodiment of the present disclosure, the location management device may be applied to an anchor base station. The storage module 111 is specifically configured to store location information of the UE when the UE transmits the uplink data to the anchor base station.

The updating module 112 is specifically configured to update the location information of the UE based on a cell update report message, when the UE reselects the another cell of the anchor base station and transmits the cell update report message to the anchor base station.

The updating module 112 is specifically configured to receive the location information of the UE reported by a new target base station through a location report of an Xn interface, and update the location information of the UE, when the UE reselects a cell of the new target base station and issues the cell update report to the new target base station, wherein the new target base station does not notify the anchor base station of a movement of the UE when the UE moves between cells in the new target base station.

The location management device further includes a first forward transmission module configured to: forward-transmit downlink data of the UE transmitted by a core network to the new target base station after receiving the downlink data, to enable the new target base station to transmit the downlink data to the UE in a cell where the UE is located after the new target base station receives the downlink data.

The storage module 111 is further specifically configured to receive the location information of the UE reported by the new target base station through a location report or UE context retrieval of an Xn interface, and update the location information of the UE, when the UE transmits the uplink data to the new target base station.

The location management device further includes: a first receiving module configured to receive the uplink data forward-transmitted by the new target base station; a first transmission module configured to transmit the uplink data to a core network; and a second forward transmission module configured to forward-transmit the downlink data of the UE transmitted by the core network to the new target base station, after receiving the downlink data, to enable the new target base station to transmit the downlink data to the UE in a cell where the UE is located, after the new target base station receives the downlink data.

The location report or the UE context retrieval carries at least one type of the following information: an inactive state identifier of the UE, downlink data forward transmission tunnel information, and the location information of the UE.

The location information of the UE includes at least one type of the following information: a cell identifier, transmission reference point information, and a base station identifier.

In the embodiment of the present disclosure, the location management device may be applied to a new target base station. The updating module 112 is specifically configured to: store the location information of the UE based on a cell update report message, when the UE reselects a cell of the new target base station and transmits the cell update report message to the new target base station, wherein the cell update report message carries an inactive state identifier of the UE.

In the case that a base station which the UE accesses last time is not an anchor base station, and the cell update report message further carries information of an original target base station which the UE accesses last time, the location management device further includes an issuing module configured to issue UE context release to the original target base station based on the information of the original target base station, to enable the original target base station to release a context of the UE.

The location management device further includes a second receiving module configured to receive downlink data of the UE forward-transmitted by the anchor base station, wherein the anchor base station receives the downlink data from the core network, and issues UE context retrieval or a new Xn process to another base station in an access network notification area after the anchor base station receives the downlink data, and the anchor base station receives downlink data forward transmission tunnel information and indication information including a context of the UE returned by the new target base station, and receives indication information including no context of the UE returned by a base station including no context of the UE in the access network notification area, wherein the UE context retrieval or the new Xn process carries an inactive state identifier of the UE, and the base station including no context of the UE does not return the downlink data forward transmission tunnel information.

In the embodiment of the present disclosure, the location management device may be applied to a core network. The updating module 112 is specifically configured to receive a path update request message transmitted by the new target base station to change a NG connection of the UE, when the UE reselects a cell of the new target base station and issues the cell update report to the new target base station, wherein the new target base station does not notify the core network of a movement of the UE when the UE moves between cells in the new target base station.

The location management device further includes a third transmission module configured to: transmit downlink data of the UE to the new target base station, to enable the new target base station to transmit the downlink data to the UE in a cell where the UE is located, after the new target base station receives the downlink data.

With the location management device according to the embodiment of the present disclosure shown in FIG. 11, the location information of the UE is stored or updated in real time by the network side, and the location of the UE is effectively managed, so that the base station accessed by the UE transmits downlink data of the UE to the UE directly from the cell where the UE is located, after the base station receives the downlink data, with no need to transmit a notification message and data to the UE from all cells of an entire RNA, thereby saving signaling overhead of both the network side and the UE side, reducing power consumption of the UE, and achieving effective transmission of data (if any) of the UE.

Figure 12:
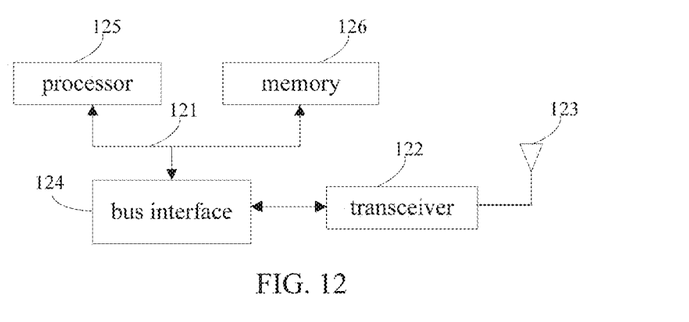
FIG. 12 is a schematic structural diagram of a network side device according to the present disclosure.

Referring to FIG. 12, an embodiment of the present disclosure shown in FIG. 12 provides a network side device. The network side device includes a bus 121, a transceiver 122, an antenna 123, a bus interface 124, a processor 125, and a memory 126.

The processor 125 is configured to read a program in the memory 126, and perform the following process: when a UE transmits uplink data, the processor 125 controls the memory 126 to store location information of the UE; or when a UE reselects another cell, and issues a cell update report to an accessed base station, the processor 125 controls the memory 126 to update location information of the UE. The UE is a UE of a specific type or a UE having a specific service, which is tracked by the network side.

The transceiver 122 is configured to receive and transmit data under the control of the processor 125.

In FIG. 12, the bus architecture (represented by a bus 121) can include any number of interconnected buses and bridges, and the bus 121 links one or more processors represented by the first processor 125 and various circuits of the memory represented by the memory 126 together. The bus 121 can also link various other circuits, such as peripherals, voltage regulators, and power management circuits together. These components are known in the art, and therefore will not be further described herein. The bus interface 124 provides an interface between the bus 121 and the transceiver 122. The transceiver 122 can be an element or a plurality of elements, such as a plurality of receivers and transmitters, providing units for communicating with various other devices on a transmission medium. Data processed by the processor 125 is transmitted on a wireless medium by the antenna 123. Further, the antenna 123 also receives data and transmits the data to the processor 125.

The processor 125 is responsible for managing the bus 121 and normal processing, and can also provide various functions, including timing, peripheral interfaces, voltage regulation, power management, and other control functions, whereas the memory 126 can be used to store data used by the processor 125 when executing operations.

Optionally, the processor 124 can be a central processing unit (CPU), an application specific integrated circuit (ASIC), a field-programmable gate array (FPGA), or a complex programmable logic device (CPLD).

It is to be understood that the terms "comprise", "comprising", or any other variants thereof, is intended to encompass a non-exclusive inclusion, such that a process, method, article, or device including a series of elements not only includes those elements, but also includes other elements that are not explicitly listed, or elements that are inherent to such a process, method, article, or device. Without any further restriction, an element defined by a phrase "including a . . . " does not exclude the presence of additional identical elements in the process, method, article, or device that includes the element.

The above-mentioned serial numbers of the embodiments of the present disclosure are merely for the purpose of description, and do not represent which embodiment is better and which embodiment is not as good.

Through the description of the above embodiments, those skilled in the art can clearly understand that the foregoing method embodiments can be implemented by means of software plus a necessary general hardware platform, and of course, can also be implemented through hardware, but in many cases, the former is better. Based on such understanding, the essential part of the technical solution of the present disclosure, or the part of the technical solution which contributes to the related art, may be embodied in the form of a software product. The computer software product is stored in a storage medium (e.g., ROM/RAM, magnetic disk, optical disc), and includes a plurality of instructions for enabling a terminal device (which may be a mobile phone, a computer, a server, an air conditioner, or a network device, etc.) to execute the methods of the various embodiments of the present disclosure.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A location management method, comprising:
   storing, by a network side, location information of a User Equipment (UE), when the UE transmits uplink data; or
   updating, by the network side, the location information of the UE, when the UE reselects another cell and issues a cell update report to an accessed base station, wherein the UE is of a specific type or has a specific service, and the UE is tracked by the network side,
   wherein the step of storing by the network side the location information of the UE when the UE transmits the uplink data comprises:
   storing, by an anchor base station, the location information of the UE, when the UE transmits the uplink data to the anchor base station,
   wherein the step of updating by the network side the location information of the UE when the UE reselects the another cell and issues the cell update report to the accessed base station comprises:
   receiving, by the anchor base station, the location information of the UE reported by a new target base station through a location report of an Xn interface, and updating, by the anchor base station, the location information of the UE, when the UE reselects a cell of the new target base station and issues the cell update report to the new target base station.

2. The location management method according to claim 1, wherein the new target base station does not notify the anchor base station of a movement of the UE when the UE moves between cells in the new target base station.

3. The location management method according to claim 1, further comprising:
   forward-transmitting, by the anchor base station, downlink data of the UE transmitted by a core network to the new target base station after the anchor base station receives the downlink data, to enable the new target base station to transmit the downlink data to the UE in a cell where the UE is located after the new target base station receives the downlink data.

4. The location management method according to claim 1, wherein the step of storing by the network side the location information of the UE when the UE transmits the uplink data further comprises:
   receiving, by the anchor base station, the location information of the UE reported by the new target base station through a location report or UE context retrieval of an Xn interface, and updating, by the anchor base station, the location information of the UE, when the UE transmits the uplink data to the new target base station.

5. The location management method according to claim 4, further comprising:
   receiving, by the anchor base station, the uplink data forward-transmitted by the new target base station;
   transmitting, by the anchor base station, the uplink data to a core network; and
   forward-transmitting, by the anchor base station, the downlink data of the UE transmitted by the core network to the new target base station, after the anchor base station receives the downlink data, to enable the new target base station to transmit the downlink data to the UE in a cell where the UE is located, after the new target base station receives the downlink data.

6. The location management method according to claim 4, wherein the location report process or the UE context retrieval carries at least one type of the following information: an inactive state identifier of the UE, downlink data forward transmission tunnel information, and the location information of the UE.

7. The location management method according to claim 6, wherein the location information of the UE comprises at least one type of the following information: a cell identifier, transmission reference point information, and a base station identifier.

8. A location management device, comprising:
   a processor; and
   a memory connected to the processor via a bus interface and configured to store computer instructions and data used by the processor when performing operations,
   wherein the processor is configured to call and execute the computer instructions to implement the method according to claim 1, and the location management device is applied to the anchor base station.

9. The location management device according to claim 8, wherein the processor is further configured to call and execute the computer instructions to:
   forward-transmit downlink data of the UE transmitted by a core network to the new target base station after receiving the downlink data, to enable the new target base station to transmit the downlink data to the UE in a cell where the UE is located after the new target base station receives the downlink data.

10. The location management device according to claim 8, wherein the processor is further configured to call and execute the computer instructions to:
    receive the location information of the UE reported by the new target base station through a location report or UE context retrieval of an Xn interface, and update the location information of the UE, when the UE transmits the uplink data to the new target base station.

11. The location management device according to claim 10, wherein the processor is further configured to call and execute the computer instructions to:
    receive the uplink data forward-transmitted by the new target base station;
    transmit the uplink data to a core network; and
    forward-transmit the downlink data of the UE transmitted by the core network to the new target base station, after the anchor base station receives the downlink data, to enable the new target base station to transmit the downlink data to the UE in a cell where the UE is located, after the new target base station receives the downlink data.

12. The location management device according to claim 10, wherein the location report process or the UE context retrieval carries at least one type of the following information: an inactive state identifier of the UE, downlink data forward transmission tunnel information, and the location information of the UE.

13. The location management device according to claim 12, wherein the location information of the UE comprises at least one type of the following information: a cell identifier, transmission reference point information, and a base station identifier.

14. A location management method, comprising:
storing, by a network side, location information of a User Equipment (UE), when the UE transmits uplink data; or
updating, by the network side, the location information of the UE, when the UE reselects another cell and issues a cell update report to an accessed base station, wherein the UE is of a specific type or has a specific service, and the UE is tracked by the network side,
wherein the step of updating by the network side the location information of the UE when the UE reselects the another cell and issues the cell update report to the accessed base station comprises:
storing, by a new target base station, the location information of the UE based on a cell update report message, when the UE reselects a cell of the new target base station and transmits the cell update report message to the new target base station, wherein the cell update report message carries an inactive state identifier of the UE,
wherein the location management method further comprises:
receiving, by the new target base station, downlink data of the UE forward-transmitted by the anchor base station, to enable the anchor base station to receive the downlink data from the core network, enable the anchor base station to issue UE context retrieval or a new Xn process to another base station in an access network notification area after the anchor base station receives the downlink data, enable the anchor base station to receive downlink data forward transmission tunnel information and indication information comprising a context of the UE returned by the new target base station, enable the anchor base station to receive indication information comprising no context of the UE returned by a base station comprising no context of the UE in the access network notification area, enable the UE context retrieval or the new Xn process to carry an inactive state identifier of the UE, and enable the base station comprising no context of the UE to do not return the downlink data forward transmission tunnel information; and
transmitting, by the new target base station, the downlink data to the UE in a cell where the UE is located.

15. The location management method according to claim 14, wherein in the case that a base station which the UE accesses last time is not an anchor base station, and the cell update report message further carries information of an original target base station which the UE accesses last time, the location management method further comprises:
issuing, by the new target base station, UE context release to the original target base station based on the information of the original target base station, to enable the original target base station to release a context of the UE.

16. A location management device, comprising:
a processor; and
a memory connected to the processor via a bus interface and configured to store computer instructions and data used by the processor when performing operations,
wherein the processor is configured to call and execute the computer instructions to implement the method according to claim 14, and the location management device is applied to the new target base station.

* * * * *